United States Patent
Yamakawa (10) Patent No.: US 11,677,310 B2
(45) Date of Patent: Jun. 13, 2023

(54) POWER CONVERTING APPARATUS AND AIR CONDITIONER

(71) Applicant: Mitsubishi Electric Corporation, Tokyo (JP)

(72) Inventor: Hidetoshi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 255 days.

(21) Appl. No.: 17/256,988

(22) PCT Filed: Sep. 12, 2018

(86) PCT No.: PCT/JP2018/033857
§ 371 (c)(1),
(2) Date: Dec. 29, 2020

(87) PCT Pub. No.: WO2020/053995
PCT Pub. Date: Mar. 19, 2020

(65) Prior Publication Data
US 2021/0143727 A1    May 13, 2021

(51) Int. Cl.
*H02M 5/458* (2006.01)
*H02M 1/14* (2006.01)
(Continued)

(52) U.S. Cl.
CPC .............. *H02M 1/14* (2013.01); *F04D 25/06* (2013.01); *H02M 5/42* (2013.01); *H02P 27/06* (2013.01)

(58) Field of Classification Search
CPC . H02M 1/14; H02M 5/42; H02M 1/36; F04D 25/06; H02P 27/06
See application file for complete search history.

(56) References Cited

U.S. PATENT DOCUMENTS 10,218,262 B1 * 2/2019 Agirman ................ H02M 7/00
10,355,585 B2 * 7/2019 Li ........................ H02M 5/4585
(Continued)

FOREIGN PATENT DOCUMENTS

JP    2001037290 A    2/2001
JP    2013162591 A    8/2013
(Continued)

OTHER PUBLICATIONS

Office Action dated Jan. 10, 2022, issued in corresponding Indian Patent Application No. 202127004653 (and English Machine Translation).
(Continued)

*Primary Examiner* — Muhammad S Islam
(74) *Attorney, Agent, or Firm* — Posz Law Group, PLC (57) ABSTRACT

A power converting apparatus includes a diode bridge that converts first AC power supplied from a power supply into DC power, a main circuit capacitor that smooths the DC power, one or more capacitors that reduces a noise component included in the first AC power, and a path switch. The path switch switches a charging path for the main circuit capacitor so that current output from the AC power supply flows into the main circuit capacitor via the capacitor(s) from when supply of the first AC power starts until a voltage of the main circuit capacitor reaches a predetermined voltage, and that the current output from the AC power supply flows into the main circuit capacitor without bypassing the capacitor(s) after the voltage of the main circuit capacitor reaches the predetermined voltage.

7 Claims, 6 Drawing Sheets

(51) Int. Cl.
*F04D 25/06* (2006.01)
*H02M 5/42* (2006.01)
*H02P 27/06* (2006.01)

(56) References Cited

U.S. PATENT DOCUMENTS

| | | | |
|---|---|---|---|
| 2004/0095784 A1* | 5/2004 | Zhou | H02M 5/458 |
| | | | 363/37 |
| 2014/0003099 A1* | 1/2014 | Dillig | H02M 5/458 |
| | | | 363/37 |
| 2015/0098258 A1 | 4/2015 | Park et al. | |
| 2016/0268797 A1* | 9/2016 | Li | H02M 1/32 |
| 2017/0141565 A1 | 5/2017 | White | |

FOREIGN PATENT DOCUMENTS

| | | | |
|---|---|---|---|
| JP | 2008136316 A | 6/2018 | |
| KR | 1020100039423 A | 4/2010 | |

OTHER PUBLICATIONS

Office Action dated Jan. 12, 2022, issued in corresponding Australian Patent Application No. 2018441279.

\* cited by examiner

POWER CONVERTING APPARATUS AND AIR CONDITIONER

CROSS REFERENCE TO RELATED APPLICATION

This application is a U.S. national stage application of PCT/JP2018/033857 filed on Sep. 12, 2018, the contents of which are incorporated herein by reference.

FIELD

The present invention relates to a power converting apparatus and an air conditioner capable of preventing or reducing inrush current generated at power-on.

BACKGROUND

A device such as an outdoor unit of an air conditioner including a circuit for power conversion includes an inrush current prevention circuit that prevents or reduces inrush current generated at power-on from doing damage to the components. The inrush current prevention circuit can be implemented by arranging a resistor or a positive temperature coefficient (PTC) thermistor having resistance varying depending on temperature between an alternating-current (AC) power supply and a rectifier. In a case of preventing or reducing inrush current by a resistor or a PTC thermistor, power loss occurs due to power consumption by the resistor. In order to solve this problem, an invention taught in Patent Literature 1 prevents or reduces inrush current by providing a current limiting capacitor between the AC power supply and the rectifier such that current flow through the current limiting capacitor to the rectifier for a while after power-on and charge a smoothing capacitor provided on an output side of the rectifier. In addition, after charging of the smoothing capacitor is terminated, the current supply path is switched so that current flows to the rectifier, bypassing the current limiting capacitor.

CITATION LIST

Patent Literature

Patent Literature 1: Japanese Patent Application Laid-open No. 2008-136316

SUMMARY

Technical Problem

The invention taught in Patent Literature 1 needs to additionally provide the capacitor for preventing or reducing inrush current, which increases the circuit size.

The present invention has been made in view of the above, and an object thereof is to provide a power converting apparatus capable of preventing or reducing inrush current while avoiding an increase in circuit size.

Solution to Problem

To solve the aforementioned problems and achieve the object, a power converting apparatus according to the present invention includes a diode bridge that converts first AC power supplied from an AC power supply into DC power, a main circuit capacitor that smooths the DC power, an inverter that converts the DC power smoothed by the main circuit capacitor into second AC power and supplies the second AC power to a load, and at least one capacitor that reduces a noise component included in the first AC power. The power converting apparatus also includes a path switching unit that switches a charging path for the main circuit capacitor so that current output from the AC power supply flows into the main circuit capacitor via the capacitor from when supply of the first AC power starts until a voltage of the main circuit capacitor reaches a predetermined voltage, and that the current output from the AC power supply flows into the main circuit capacitor without passing through the capacitor after the voltage of the main circuit capacitor reaches the predetermined voltage.

Advantageous Effects of Invention

According to the present invention, an effect of achieving a power converting apparatus capable of preventing or reducing inrush current while avoiding an increase in circuit size is produced.

DESCRIPTION OF EMBODIMENTS

A power converting apparatus and an air conditioner according to certain embodiments of the present invention will be described in detail below with reference to the drawings. Note that the present invention is not limited to the embodiments.

First Embodiment

Figure 1:
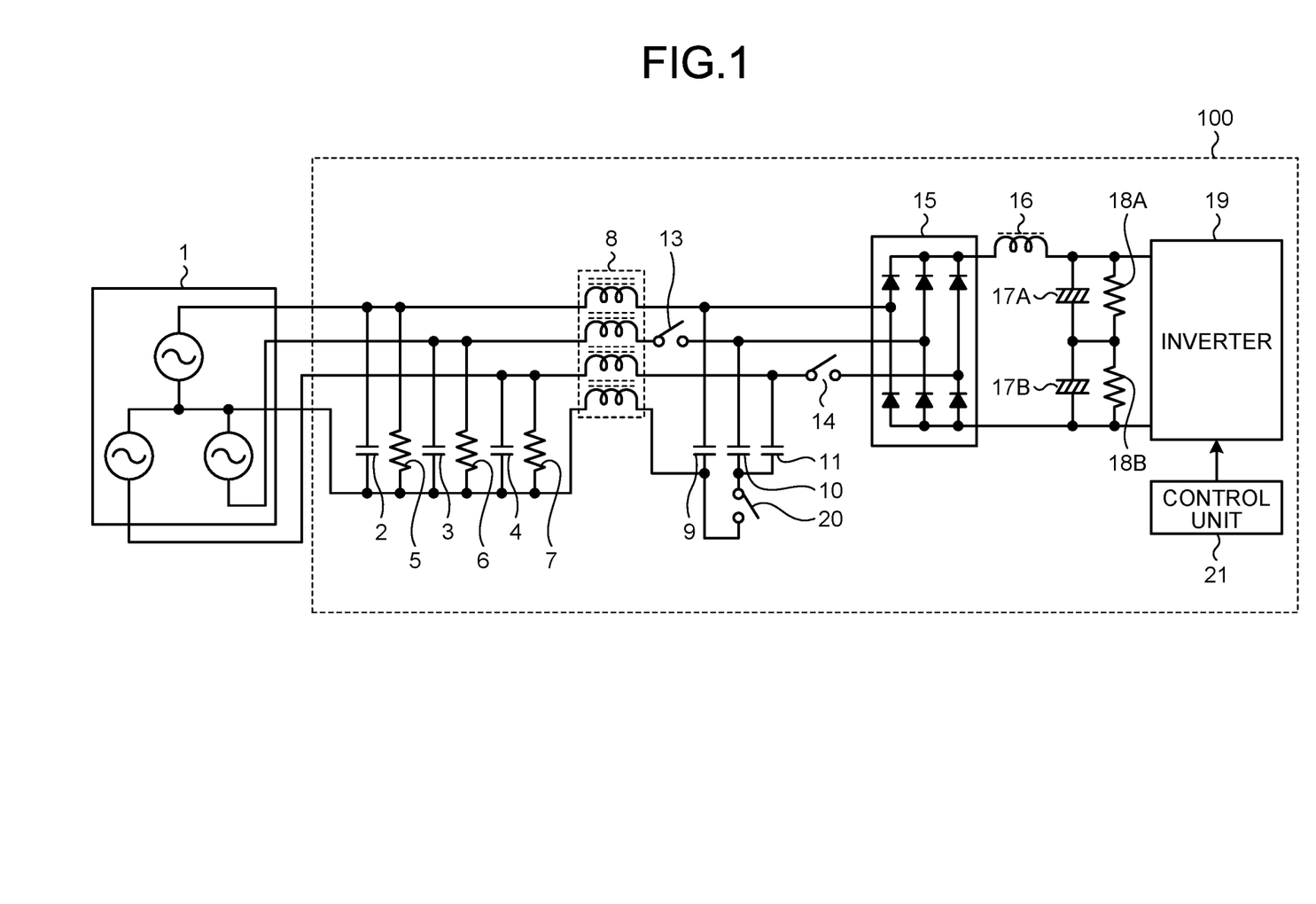
FIG. 1 is a diagram illustrating an example of a configuration of a power converting apparatus according to a first embodiment.

FIG. 1 is a diagram illustrating an example of a configuration of a power converting apparatus according to a first embodiment of the present invention.

A power converting apparatus 100 according to the present embodiment is connected to a power supply 1 that is a three-phase four-wire alternating-current (AC) power supply. The power converting apparatus 10 converts first AC power supplied from the power supply 1, into second AC power to be supplied to a load, which is not illustrated. In the following description, the three phases of three-phase AC power output from the power supply 1 will be referred to as a first phase, a second phase, and a third phase, where appropriate. The load that is not illustrated in FIG. 1 is a motor for driving a compressor of an air conditioner, a motor for driving a blower fan of an air conditioner, or the like.

The power converting apparatus 100 includes capacitors 2 to 4, 9 to 11, 17A, and 17B, resistors 5 to 7, 18A, and 18B, a common coil 8, relays 13, 14, and 20, a diode bridge 15, a direct-current (DC) reactor 16, an inverter 19, and a control unit 21.

The capacitor 2 and the resistor 5 each have one end connected to an output point of the first phase of the power supply 1, and the other end connected to a neutral point of the power supply 1. The capacitor 3 and the resistor 6 each have one end connected to an output point of the second phase of the power supply 1, and the other end connected to the neutral point of the power supply 1. The capacitor 4 and the resistor 7 each have one end connected with an output point of the third phase of the power supply 1, and the other end connected to the neutral point of the power supply 1. While the phase to which the capacitor 2 and the resistor 5 are connected is referred to as the first phase, this is only for convenience of explanation.

AC powers of the first to third phases output by the power supply 1 are input to the diode bridge 15 via lines connected to the output points of the individual phases. In addition, the capacitors 9 to 11 for noise component reduction are connected between the neutral point and the output points of the first to third phases of the power supply 1. One end of the capacitor 9 is connected to a first line that is a line interconnecting the output point of the first phase of the power supply 1 and an input point of the first phase of the diode bridge 15. The other end of the capacitor 9 is connected to a neutral line. The capacitor 9 is a capacitor for reducing the noise component on the first line. One end of the capacitor 10 is connected to a second line that is a line interconnecting the output point of the second phase of the power supply 1 and an input point of the second phase of the diode bridge 15. The other end of the capacitor 10 is connected to the neutral line. The capacitor 10 is a capacitor for reducing the noise component on the second line. One end of the capacitor 11 is connected to a third line that is a line interconnecting the output point of the third phase of the power supply 1 and an input point of the third phase of the diode bridge 15. The other end of the capacitor 11 is connected to the neutral line. The capacitor 11 is a capacitor for reducing the noise component on the third line.

In addition, the common coil 8 for reducing common mode noise flowing through the first line to third lines and the neutral line is provided between the capacitors 2 to 4, the resistors 5 to 7 and the capacitors 9 to 11 described above.

The capacitors 2 to 4, 9 to 11, the resistors 5 to 7, and the common coil 8 illustrated in FIG. 1 are elements provided for reducing noise components included in AC power output from the power supply 1. Similar elements are also provided in typical power converting apparatuses. Note that the resistor 5 to 7 also function to balance voltages applied to the capacitor 2 to 4.

The diode bridge 15 rectifies AC power supplied from the power supply 1 to thereby convert the AC power into DC power. Specifically, the diode bridge 15 converts the first AC power supplied from the power supply 1, into DC power. The DC power output from the diode bridge 15 is supplied to the inverter 19. The inverter 19 converts the input DC power into the second AC power, and supplies the second AC power to the load, which is not illustrated.

The DC reactor 16, the capacitors 17A and 17B, which are main circuit capacitors, and the resistors 18A and 18B are provided between the diode bridge 15 and the inverter 19. The DC reactor 16 and the capacitors 17A and 17B are provided for smoothing DC power output from the diode bridge 15. The resistors 18A and 18B are provided for adjusting the balance of voltages charged in the capacitors 17A and 17B and for discharging the capacitors 17A and 17B.

The DC reactor 16 has one end connected to an output point on the positive side of the diode bridge 15 and the other end connected to an input point on the positive side of the inverter 19. One end of the capacitor 17A and one end of the resistor 18A are also connected to the other end of the DC reactor 16. One end of the capacitor 17B is connected to the other end of the capacitor 17A, and one end of the resistor 18B is connected to the other end of the resistor 18A. The other end of the capacitor 17B and the other end of the resistor 18B are connected to an output point on the negative side of the diode bridge 15 and an input point on the negative side of the inverter 19. In addition, a short circuit is defined between a connection point interconnecting the capacitors 17A and 17B and a connection point interconnecting the resistors 18A and 18B.

The relay 13, which is a first relay, is provided on the second line, and has one end connected to the common coil 8 and the other end connected to one end of each of the diode bridge 15 and the capacitor 10. Namely, the relay 13 is provided between the common coil 8 on the second line and the connection point of the second line connected to the capacitor 10. The relay 13 is controlled by the control unit 21.

The relay 14, which is a second relay, is provided on the third line, and has one end connected to the common coil 8 and one end of the capacitor 11. The relay 14 has the other end connected to the diode bridge 15. Namely, the relay 14 is provided between the diode bridge 15 on the third line and the connection point of the third line connected to the capacitor 11. The relay 14 is controlled by the control unit 21.

The relay 20, which is a third relay, is provided on the neutral line, and has one end connected to the capacitor 9 and the other end connected to the capacitor 10. Namely, the relay 20 is provided between the connection point of the neutral line connected to the capacitor 9 and the connection point of the neutral line connected to the capacitor 10. When the relay 20 is turned off, the capacitors 10 and 11 are disconnected from the neutral line. The relay 20 is controlled by the control unit 21.

The control unit 21 controls each of switching elements (which are not illustrated) of the inverter 19, and controls the relays 13, 14, and 20. The control unit 21 is configured to operate upon receiving power supply from a power supply circuit, which is not illustrated. The power supply circuit converts power supplied from the power supply 1 into DC voltage necessary for the control unit 21 and supplies the DC voltage to the control unit 21. The control unit 21 constitutes, together with the relays 13, 14, and 20, a path switching unit for switching charging paths of the capacitors 17A and 17B.

Next, a description will be made as to operation of the power converting apparatus 100 when the power converting apparatus 100 is powered on, that is, when supply of AC power from the power supply 1 to the power converting apparatus 100 starts.

Before the power converting apparatus 100 is powered on, the relays 13, 14, and 20 are open. When the power converting apparatus 100 is powered on with the relays 13, 14, and 20 open, power is supplied taking alternately a path illustrated in FIG. 2 and a path illustrated in FIG. 3, thereby charging the capacitors 17A and 17B. Specifically, in a case of a first charging path 201 illustrated in FIG. 2, current output from the power supply 1 to the first line flows to the second line via a diode corresponding to the first phase among three diodes provided on the positive side of the diode bridge 15, the DC reactor 16, the capacitors 17A and 17B, and a diode corresponding to the second phase among three diodes provided on the negative side of the diode bridge 15, further flows to the third line via the capacitor 10 and the capacitor 11, and then returns to the power supply 1. In addition, in a case of a second charging path 202 illustrated in FIG. 3, current output from the power supply 1 to the third line flows to the second line via the capacitor 11 and the capacitor 10, further flows to the first line via a diode corresponding to the second phase among the three diodes provided on the positive side of the diode bridge 15, the DC reactor 16, the capacitors 17A and 17B, and a diode corresponding to the first phase among the three diodes provided on the negative side of the diode bridge 15, and then returns to the power supply 1. In this manner, the capacitors 17A and 17B are charged through the two paths.

Assume that the capacitance of the capacitors 10 and 11 and the capacitance of the capacitors 17A and 17B provided on the two charging paths satisfy the relation expressed by formula (1).

$$(\text{the capacitance of the capacitors 10 and 11}) \ll (\text{the capacitance of the capacitors 17}A \text{ and 17}B) \quad (1)$$

Figure 4:
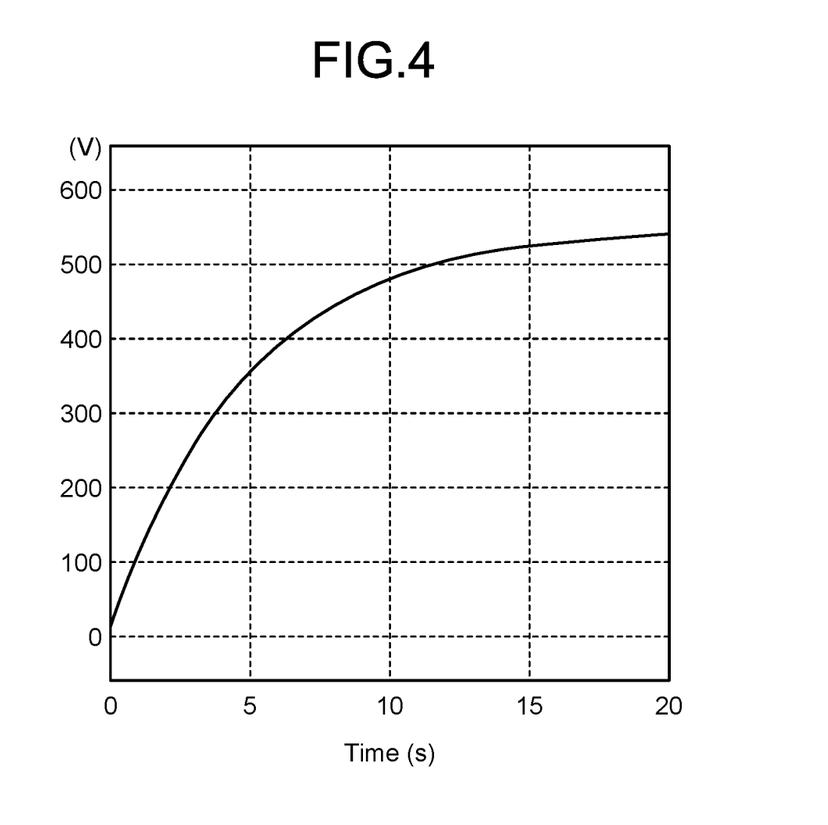
FIG. 4 is a graph illustrating an example of a change in voltage after power-on of the main circuit capacitors of the power converting apparatus according to the first embodiment.

In the case of power-on under such a condition, the capacitors 17A and 17B of the power converting apparatus 100 are charged by an amount of charge received by the capacitors 10 and 11. As expressed by the formula (1), because the capacitance of the capacitors 10 and 11 is much smaller than that of the capacitors 17A and 17B, the voltage charged in the capacitors 17A and 17B is small. Thus, in the power converting apparatus 100, the charging operations using the two charging paths described above are repeated every power supply period, and the capacitors 17A and 17B are thus charged over a time of a few tens of seconds as illustrated in FIG. 4. FIG. 4 is a graph illustrating an example of a change in voltage of the capacitors 17A and 17B after power-on, which are the main circuit capacitors of the power converting apparatus 100 according to the first embodiment. The voltage illustrated in FIG. 4 is a voltage across the capacitors 17A and 17B connected in series, that is, a sum of the voltage of the capacitor 17A and the voltage of the capacitor 17B, and is applied to the inverter 19.

In the charging operations described above, it takes time from power-on until the voltage across the capacitors 17A and 17B reaches a voltage necessary for the inverter 19, which is a predetermined voltage. This is because current flowing into the capacitors 17A and 17B is limited to a value corresponding to the capacitance of the capacitors 10 and 11. Thus, in the power converting apparatus 100, the time taken from power-on until the voltage across the capacitors 17A and 17B reaches the predetermined voltage becomes longer, but is not a problem because it takes more time for the power converting apparatus 100 to perform an initialization process in starting the operation. The initialization process herein includes a process of communication with a board, which is not illustrated, a process of obtaining information output from respective sensors, which are not illustrated, a process of checking whether or not abnormality is present in a voltage detecting circuit and a current detecting circuit, which are not illustrated, and the like. Note that, if the charging time until the voltage of the capacitors 17A and 17B reaches the predetermined voltage is longer the time taken for the initialization process, a display unit, which is not illustrated, may display a waiting state to inform a user that it will take some time before the operation starts.

Figure 2:
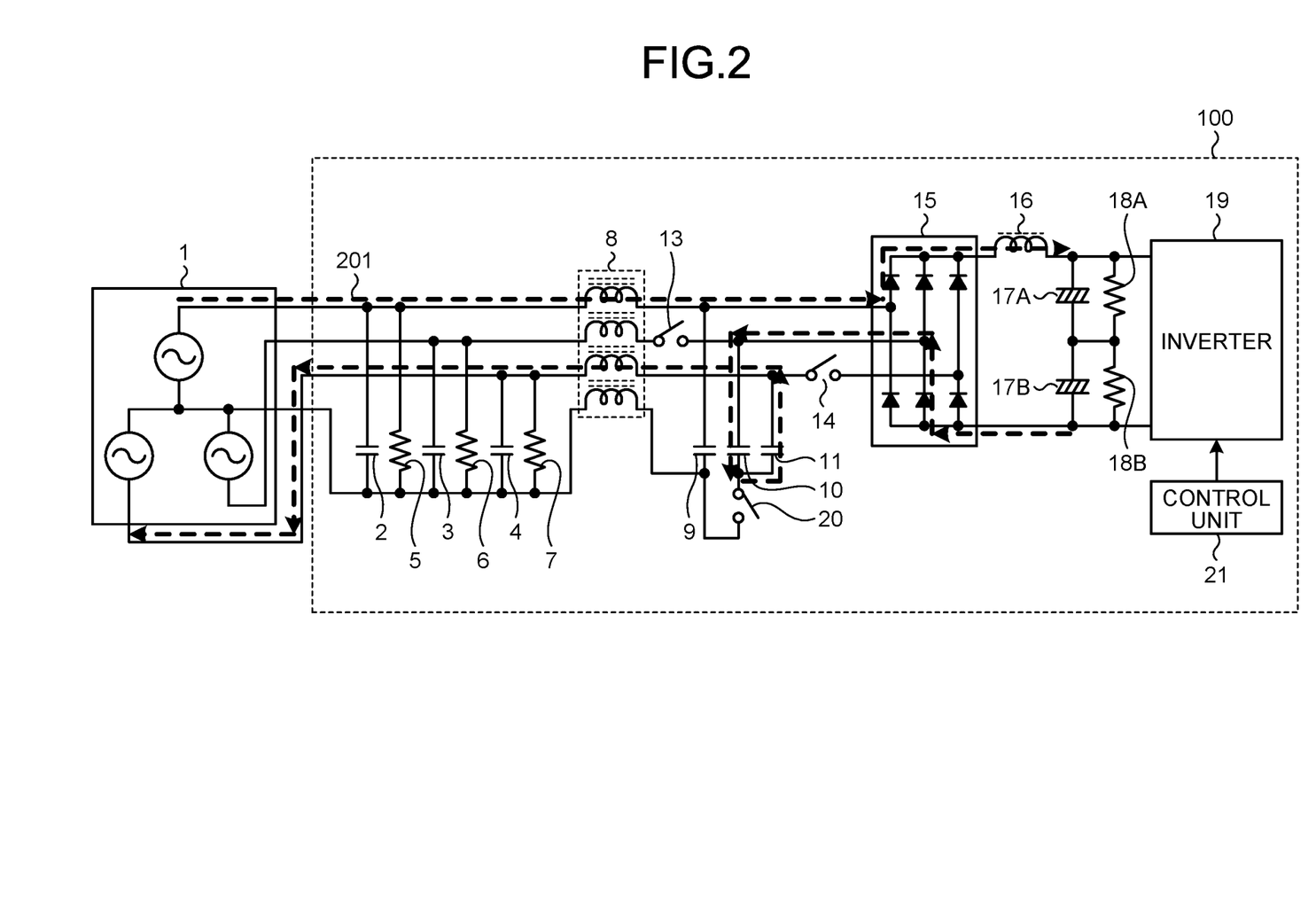
FIG. 2 is a diagram illustrating a first charging path of main circuit capacitors of the power converting apparatus according to the first embodiment.
Figure 3:
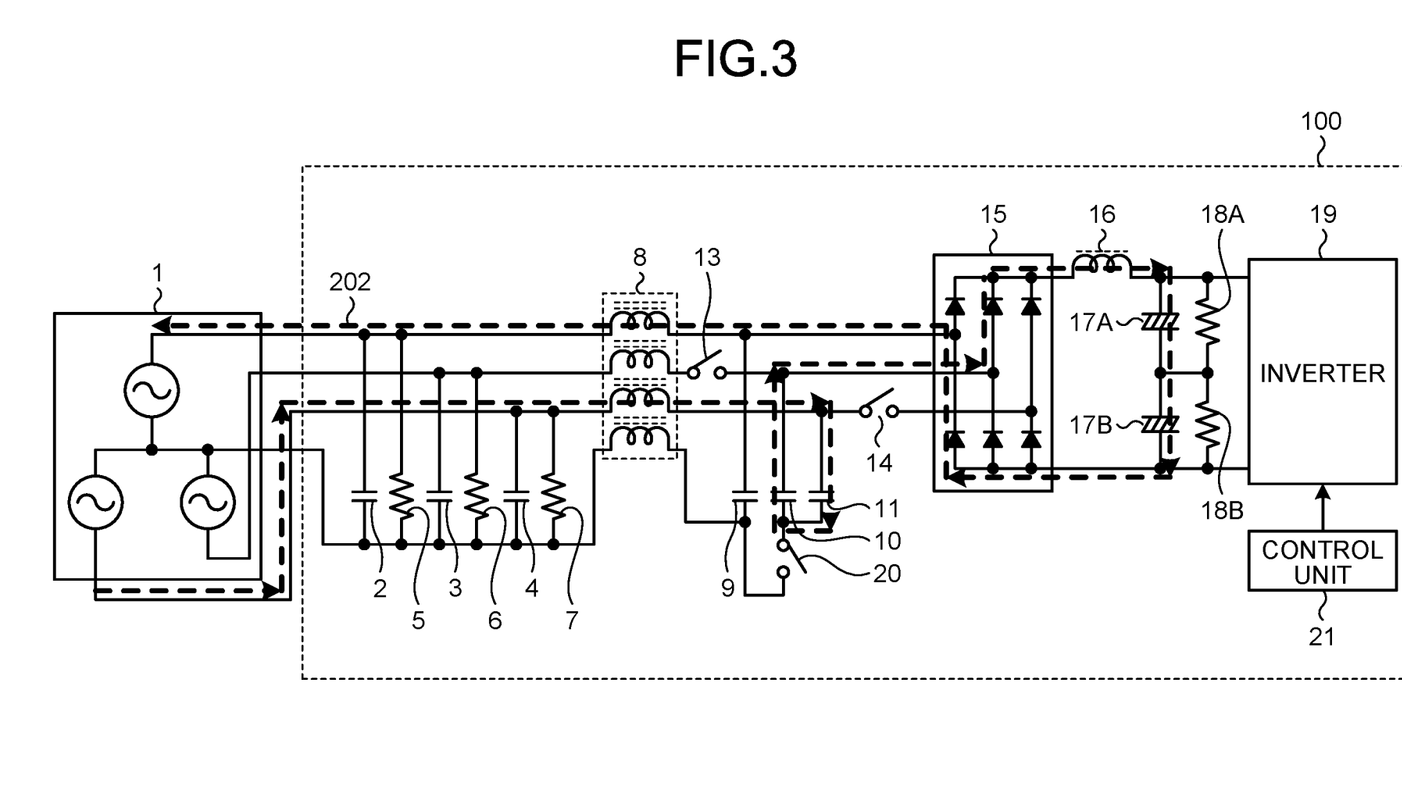
FIG. 3 is a diagram illustrating a second charging path of the main circuit capacitors of the power converting apparatus according to the first embodiment.

In addition, because the first charging path 201 illustrated in FIG. 2 and the second charging path 202 illustrated in FIG. 3 include the capacitors 10 and 11 having a capacitance smaller than that of the capacitors 17A and 17B and the current flowing into the capacitors 17A and 17B is limited to a value corresponding to the capacitance of the capacitors 10 and 11, an inrush current generated when the power supply 1 is turned on is prevented or reduced.

Figure 5:
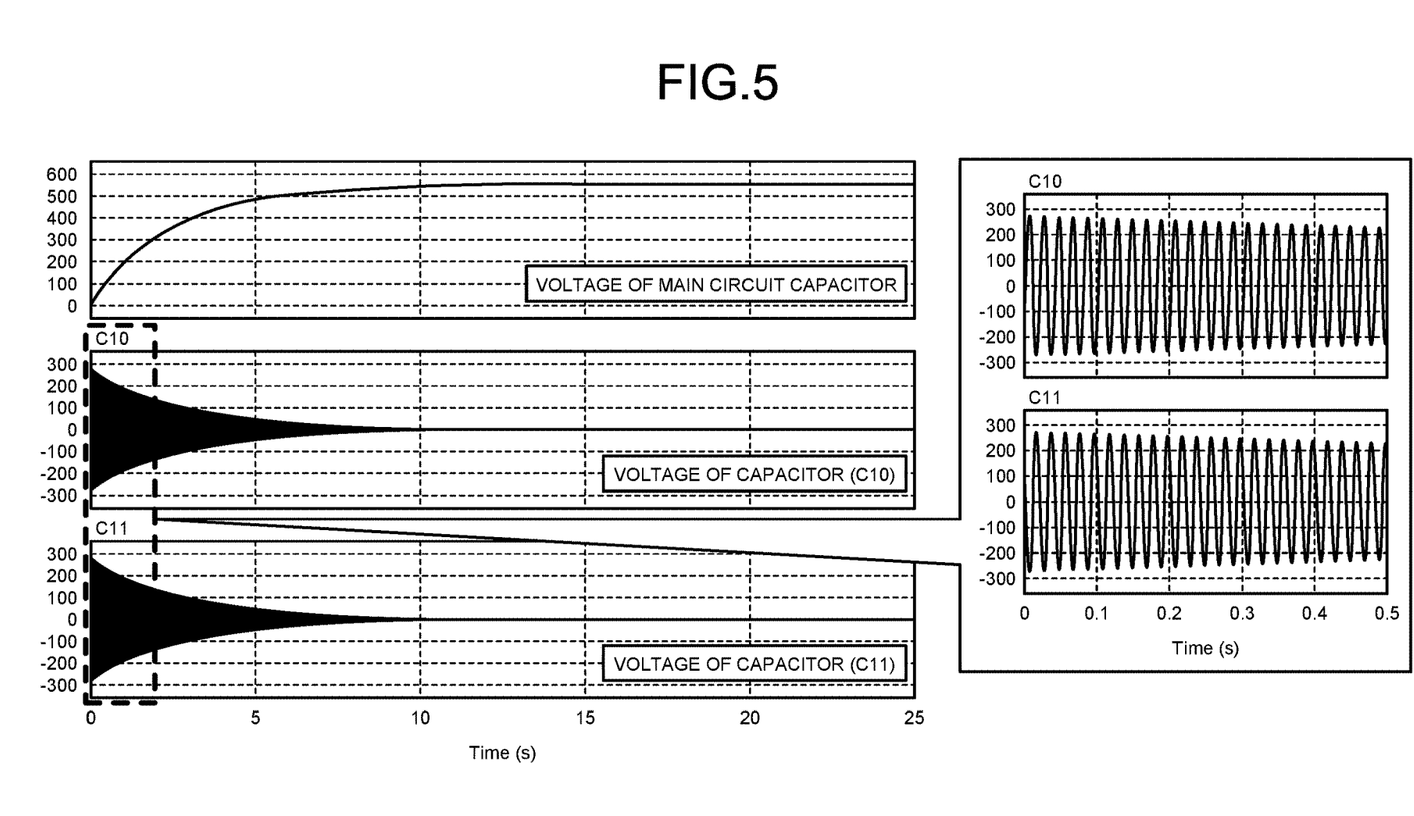
FIG. 5 is a graph illustrating the relation of voltages of respective capacitors included in the power converting apparatus according to the first embodiment.

When charging of the capacitors 17A and 17B is terminated, the control unit 21 controls the relays 13, 14, and 20 in order that the capacitors 10 and 11 having been used for preventing or reducing inrush current are used for the original purpose, that is, in order that the capacitors 10 and 11 are used as capacitors for noise component reduction. Specifically, the control unit 21 first turns the relay 20 on. As illustrated in FIG. 5, when the capacitors 17A and 17B, which are main circuit capacitors, are sufficiently charged, the voltage across the capacitors 10 and 11 is small. The relay 20 is switched on in this state, so as to prevent or reduce inrush current into the capacitors 10 and 11 upon switching of the connection, and start use of the capacitors 10 and 11 as capacitors for noise component reduction. Thereafter, the control unit 21 switches the relays 13 and 14 on, and powers of the first to third phases output by the power supply 1 are thus supplied to the diode bridge 15. Specifically, the charging path of the capacitors 17A and 17B is switched to a third charging path that does not include the capacitors 10 and 11.

As described above, the power converting apparatus 100 according to the present embodiment includes the capacitors 9 to 11, which are capacitors for noise component reduction connected between the neutral line and the first to third lines for supplying, to the diode bridge 15, the individual AC powers of three phases output from the power supply 1, which is a three-phase four-wire AC power supply, the relay 13 provided on the second line, the relay 14 provided on the third line, the relay 20 provided on the neutral line, the capacitors 17A and 17B, which are main circuit capacitors, and the control unit 21 that controls the relays 13, 14, and 20. In addition, the power converting apparatus 100 uses capacitors provided for reducing noise components, as capacitors for preventing or reducing inrush current to the main circuit capacitors, the inrush current being generated when the power supply 1 is turned on. Specifically, in the power converting apparatus 100, the control unit 21 controls the relays to switch the charging path of the main circuit capacitors, so that the capacitors 10 and 11 are included in the charging path of the main circuit capacitors from when the power supply 1 is turned on until the voltage of the main circuit capacitors reaches the predetermined voltage, and that the capacitors 10 and 11 are not included in the charging path of the main circuit capacitors after the voltage of the main circuit capacitors reaches the predetermined voltage. As a result, inrush current at power-on can be prevented or reduced. In addition, while the invention taught in Patent Literature 1 uses one capacitor (current limiting capacitor) for preventing or reducing inrush current, and three relays (two power supply switches and one current limiting switch) for switching the path through which current flows to prevent or reduce inrush current, the power converting apparatus 100 according to the present embodiment is capable of preventing or reducing inrush current without providing an additional capacitor for preventing or reducing inrush current. The power converting apparatus 100 can thus prevent or reduce inrush current at power-on while avoiding an increase in circuit size.

Second Embodiment

The power converting apparatus 100 described in the first embodiment is configured to have no resistor for balancing voltages inserted with respect to the capacitors and 11 included in the charging paths (the first charging path 201 and the second charging path 202) of the main circuit capacitors, the charging paths being provided before the voltage of the main circuit capacitors reaches the predetermined voltage. Depending on the capacitance ratio of the capacitors 10 and 11, the voltage may be biased to one capacitor, with the result that the voltage of the capacitor 10 and the voltage of the capacitor 11 may become imbalanced. Thus, in a case where the voltages are imbalanced and the voltage of the capacitor 10 or 11 exceeds a withstand voltage, resistors for balancing the voltages may be provided in parallel with the capacitors 10 and 11. In addition, a resistor for balancing power supplies may also be provided in parallel with the capacitor 9 that is not included in the charging paths of the capacitors.

As described above, the power converting apparatus according to the second embodiment includes resistors provided for balancing the voltages of the capacitors provided for reducing noise components and included in the charging paths of the main circuit capacitors immediately after power-on. This can prevent or reduce the voltage of one of the capacitors included in the charging path of the main circuit capacitor from becoming high and exceeding a withstand voltage immediately after power-on.

Third Embodiment

Figure 6:
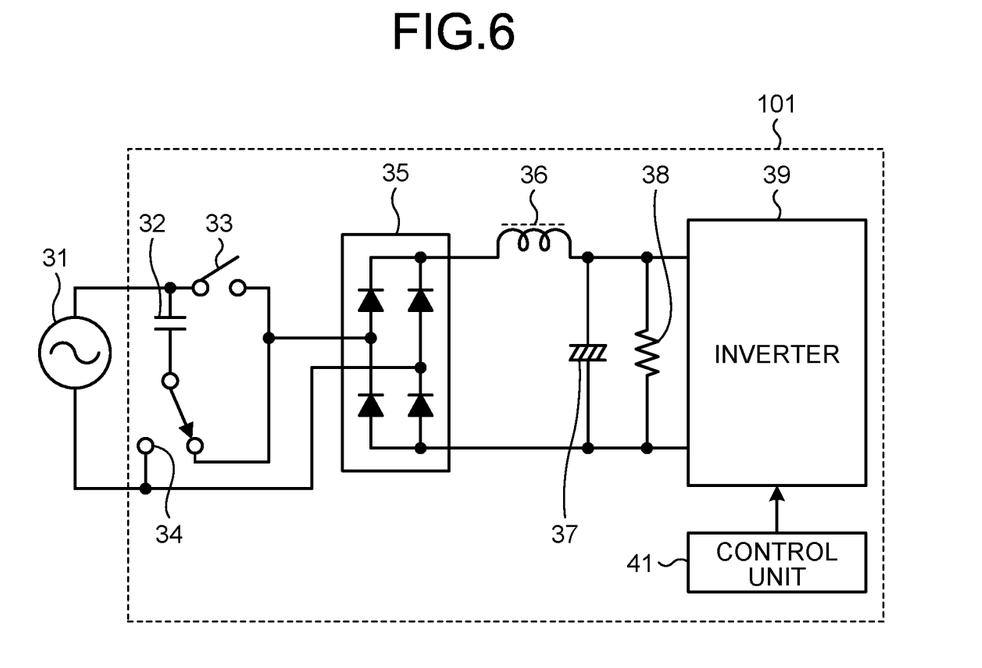
FIG. 6 is a diagram illustrating an example of a configuration of a power converting apparatus according to a third embodiment.

FIG. 6 is a diagram illustrating an example of a configuration of a power converting apparatus according to a third embodiment of the present invention. The power converting apparatuses 100 according to the first and second embodiments is each configured to convert a first AC pose supplied from the power supply 1, which is a three-phase four-wire AC power supply, into a second AC power and supply the second AC power to a load. In contrast, the power converting apparatus 101 according to the third embodiment illustrated in FIG. 6 converts single-phase AC power supplied from the power supply 31, into a second AC power, and supplies the second AC power to a load. In the present embodiment, the single-phase AC power supplied from the power supply 31 is the first AC power.

The power converting apparatus 101 includes capacitors 32 and 37, relays 33 and 34, a diode bridge 35, a DC reactor 36, a resistor 38, an inverter 39, and a control unit 41.

The capacitor 32 has one end connected to the power supply 31, and the other end connected to the relay 34. The capacitor 32 is provided for reducing a noise component included in the first AC power.

The relay 33 has one end connected to a connection point interconnecting the capacitor 32 and the power supply 31, and the other end connected to the diode bridge 35. The relay 34 includes a first terminal, a second terminal, and a third terminal, and the capacitor 32 is connected to the first terminal. The second terminal of the relay 34 is connected to the power supply 31 and the diode bridge 35. The third terminal of the relay 34 is connected to the diode bridge 35.

The diode bridge 35 rectifies AC power supplied from the power supply 31 to convert the AC power into DC power. Specifically, the diode bridge 35 converts the first AC power supplied from the power supply 31 into DC power. The DC power output from the diode bridge 35 is supplied to the inverter 39. The inverter 39 converts the input DC power into the second AC power, and supplies the second AC power to the load, which is not illustrated.

The DC reactor 36, the capacitor 37, which is a main circuit capacitor, and the resistor 38 are provided between the diode bridge 35 and the inverter 39. The DC reactor 36 and the capacitor 37 are provided to smooth DC power output from the diode bridge 35. The resistor 38 is provided to discharge the charged capacitor 37.

The DC reactor 36 has one end connected to an output point on the positive side of the diode bridge 35, and the other end connected to an input point on the positive side of the inverter 39. One end of each of the capacitor 37 and the resistor 38 is also connected to the DC reactor 36. The other end of each of the capacitor 37 and the resistor 38 is connected to an output point on the negative side of the diode bridge 35 and an input point on the negative side of the inverter 39.

The control unit 41 controls each of switching elements (which are not illustrated) of the inverter 39, and controls the relays 33 and 34. The control unit 41 is configured to operate upon receiving power supply from a power supply circuit, which is not illustrated. The power supply circuit converts power supplied from the power supply 31 into DC voltage necessary for the control unit 41 and supplies the DC voltage to the control unit 41. The control unit 41 constitutes, together with the relays 33 and 34, a path switching unit for switching charging paths of the capacitor 37.

Next, a description will be made as to operation of the power converting apparatus 101 when the power converting apparatus 101 is powered on, that is, when supply of AC power from the power supply 31 to the power converting apparatus 101 starts.

Before the power converting apparatus 101 is powered on, the relay 33 is open and the relay 34 is in a connection state in which the capacitor 32 is inserted in series between the power supply 31 and the diode bridge 35. When the power converting apparatus 101 is powered on in this state, the capacitor 37 is charged through a charging path provided for reducing a noise component and including the capacitor 32. Specifically, the capacitor 37 is charged through two charging paths described below. Of the two output points of the power supply 31, the output point to which the capacitor 32 and the relay 33 are connected will be referred to as a first output point and the other will be referred to as a second output point. In charging the capacitor 37 through a first charging path, current is output from the first output point of the power supply 31, flows into the capacitor 37 via the capacitor 32, the relay 34, a first positive-side diode, which is one of two diodes provided on the positive side of the diode bridge 35, and the DC reactor 36, and further returns to the power supply 31 via a first negative-side diode, which is one of two diodes provided on the negative side of the diode bridge 35. In addition, in charging the capacitor 37 through a second charging path, current is output from the second output point of the power supply 31, flows into the capacitor 37 via a second positive-side diode, which is the other of the two diodes provided on the positive side of the diode bridge 35, and the DC reactor 36, and further returns to the power supply 31 via a second negative-side diode, which is the other of the two diodes provided on the negative side of the diode bridge 35, the relay 34, and the capacitor 32.

Assume that the capacitance of the capacitor 32 and the capacitance of the capacitor 37 satisfy the relation expressed by formula (2).

$$\text{(the capacitance of the capacitor 32)} \ll \text{(the capacitance of the capacitor 37)} \qquad (2)$$

The time taken from when the power converting apparatus 101 is powered on until the voltage of the capacitor 37 reaches a predetermined voltage, that is, a voltage necessary for the inverter 39 is a few tens of seconds in a manner similar to the case where the power converting apparatus 100 according to the first embodiment is powered on. The time is not a problem, as in the power converting apparatus 100 according to the first embodiment. In addition, inrush current into the capacitor 37 generated at power-on is prevented or reduced.

When charging of the capacitor 37 is terminated, the control unit 41 controls the relays 33 and 34 in order that the capacitor 32 having been used for preventing or reducing inrush current are used as a capacitor for noise component reduction. Specifically, control unit 41 first switches the contact point of the relay 34. Subsequently, the control unit 41 turns the relay 33 on, so that the capacitor 32 is connected in parallel with the diode bridge 35. When the capacitor 37 is sufficiently charged, the voltage across the capacitor 32 is small, and inrush current into the capacitor 32 when the contact point of the relay 34 is switched is thus prevented or reduced.

For the power converting apparatus 101 according to the present embodiment, as described above, the capacitor 32, which is provided for reducing a noise component included in the AC power output from the power supply 31 that is a single-phase AC power supply, is used as a capacitor for preventing or reducing inrush current into the capacitor 37, which is a main circuit capacitor, the inrush current being generated when the power supply 31 is turned on. Specifically, the power converting apparatus 101 switches the charging path of the capacitor 37, which is the main circuit capacitor, so that the capacitor 32 is included in the charging path of the main circuit capacitor from when the power supply 31 is turned on until the voltage of the main circuit capacitor reaches the predetermined voltage, and that the capacitor 32 is not included in the charging path of the main circuit capacitor after the voltage of the main circuit capacitor reaches the predetermined voltage. As a result, it becomes possible to prevent or reduce inrush current at power-on while avoiding an increase in circuit size.

Next, a description will be made as to hardware for implementing the control unit 21 of the power converting apparatus 100 and the control unit 41 of the power converting apparatus 101 described above. The control unit 21 and the control unit 41 are implemented by processing circuitry that is electronic circuitry. The processing circuitry for implementing the control unit 21 and the control unit 41 may be dedicated hardware or a control circuit including a memory and a processor for executing programs stored in the memory.

In a case where the processing circuitry is implemented by dedicated hardware, the processing circuitry is an application specific integrated circuit (ASIC), a field programmable gate array (FPGA), or a circuit combining such circuits, for example.

Figure 7:
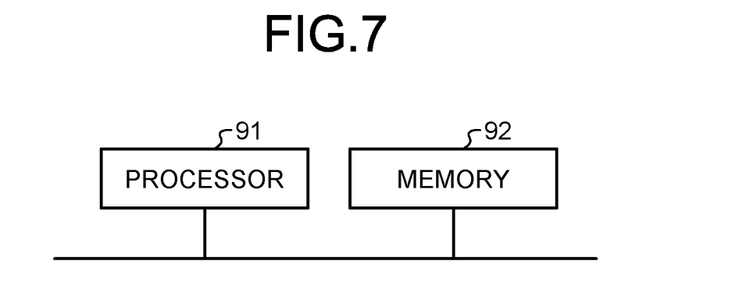
FIG. 7 is a diagram illustrating an example of hardware for implementing a control circuit of the power converting apparatus according to each of the embodiments.

Alternatively, in a case where the processing circuitry is implemented by a control circuit, the control circuit can be processing circuitry having a configuration illustrated in FIG. 7 including a processor 91 and a memory 92, for example. The processor 91 is a central processing unit (CPU; also referred to as a central processing device, a processing device, a computing device, a microprocessor, a microcomputer, or a digital signal processor (DSP)), a system large scale integration (LSI), or the like. In addition, the memory 92 is a random access memory (RAM), a read only memory (ROM), a flash memory, an erasable programmable ROM (EPROM), an electrically erasable programmable ROM (EEPROM; registered trademark) or the like.

In the case where the control units 21 and 41 are implemented by the control circuit having the configuration illustrated in FIG. 7, the control units 21 and 41 are implemented by the processor 91 executing programs for operating as the respective units. Specifically, the programs are stored in advance in the memory 92, and the control units 21 and 41 are implemented by the processor 91 by reading the programs from the memory 92 and executing the programs.

The configurations presented in the embodiments above are examples of the present invention, and can be combined with other known technologies or can be partly omitted or modified without departing from the scope of the present invention.

REFERENCE SIGNS LIST 1, 31 power supply; 2 to 4, 9 to 11, 17A, 17B, 32, 37 capacitor; 5 to 7, 18A, 18B, 38 resistor; 8 common coil; 13, 14, 20, 33, 34 relay; 15, 35 diode bridge; 16, 36 DC reactor; 19, 39 inverter; 21, 41 control unit; 100, 101 power converting apparatus; 201 first charging path; 202 second charging path.

The invention claimed is:

1. A power converting apparatus comprising:
a diode bridge to convert first AC power supplied from an AC power supply, into DC power;
a main circuit capacitor connected directly or indirectly to an output point of the diode bridge so as to smooth the DC power;
at least one capacitor respectively connected directly or indirectly to an interconnection between an output point of the AC power supply and an input point of the diode bridge, to reduce a noise component included in the first AC power; and
a path switch configured to
(i) responsive to supply of the first AC power starting, switch a charging path for the main circuit capacitor so that current output from the AC power supply flows into the main circuit capacitor via the at least one capacitor that reduces an inrush current to the main circuit capacitor, until a voltage of the main circuit capacitor reaches a predetermined voltage for initial supply to a load, and
(ii) responsive to the voltage of the main circuit capacitor reaching the predetermined voltage, switch the charging path so that the current output from the AC power supply flows into the main circuit capacitor bypassing the at least one capacitor and the at least one capacitor starts being used to reduce the noise component in the first AC power.

2. The power converting apparatus according to claim 1, wherein
after the voltage of the main circuit capacitor reaches the predetermined voltage, the capacitor is used to reduce the noise component.

3. The power converting apparatus according to claim 1, wherein the at least one capacitor comprises a plurality of capacitors, the current output from the AC power supply flows into the main circuit capacitor via the plurality of the capacitors from when supply of the first AC power is started until the voltage of the main circuit capacitor reaches the predetermined voltage, and further comprising a resistor connected in parallel with each of the plurality of capacitors to allow voltages of the capacitors to become balanced.

4. The power converting apparatus according to claim 1, wherein the first AC power is three-phase AC power.

5. The power converting apparatus according to claim 1, wherein the first AC power is single-phase AC power.

6. An air conditioner comprising:

the power converting apparatus according to claim 1; and a motor to receive, from the power converting apparatus, supply of second AC power generated by conversion of the DC power smoothed by the main circuit capacitor, and drive a compressor or a blower fan.

7. The power converting apparatus according to claim 1, wherein the path switch includes relays, and a control circuit that controls relays that connect and disconnect the at least one capacitor to and from the charging path for the main circuit capacitor.

* * * * *